United States Patent
Andersson et al.

(10) Patent No.: US 7,044,883 B2
(45) Date of Patent: May 16, 2006

(54) DEVICE FOR DRIVING A VEHICLE WHEEL

(75) Inventors: Thomas Andersson, Eskilstuna (SE); Lars Larsson, Eskilstuna (SE); Mats Akerblom, Eskilstuna (SE)

(73) Assignee: Volvo Construction Equipment Holding Sweden AB, Eskilstuna (SE)

( * ) Notice: Subject to any disclaimer, the term of this patent is extended or adjusted under 35 U.S.C. 154(b) by 0 days.

(21) Appl. No.: 11/162,279

(22) Filed: Sep. 5, 2005

(65) Prior Publication Data

US 2005/0288145 A1 Dec. 29, 2005

Related U.S. Application Data

(63) Continuation of application No. PCT/SE04/000269, filed on Feb. 26, 2004.

(30) Foreign Application Priority Data

Mar. 5, 2003 (SE) .................................... 0300594

(51) Int. Cl.
*F16H 57/08* (2006.01)
*B60W 69/00* (2006.01)
*B60K 17/00* (2006.01)

(52) U.S. Cl. .................... 475/331; 192/221.1; 180/344; 180/385

(58) Field of Classification Search ................ 475/331, 475/346; 192/221.1; 180/344, 370, 374–375, 180/383, 385; 188/265, 382
See application file for complete search history.

(56) References Cited

U.S. PATENT DOCUMENTS

| 2,108,401 | A | * | 2/1938 | Crichton | ..................... 188/362 |
| 4,181,042 | A | * | 1/1980 | Rau et al. | ................... 475/138 |
| 4,424,874 | A | | 1/1984 | Kolke et al. | |

(Continued)

FOREIGN PATENT DOCUMENTS

DE 19718744 11/1998

(Continued)

OTHER PUBLICATIONS

International Search Report from corresponding PCT/SE2004/000269.

(Continued)

*Primary Examiner*—Tisha Lewis
(74) *Attorney, Agent, or Firm*—White, Redway & Brown, LLP

(57) ABSTRACT

The invention relates to a device for driving a wheel of a vehicle. The device includes a hub for carrying the wheel in a rotationally fixed manner, a planetary gear connected between a driving axle and the hub, which planetary gear includes a planet carrier which is connected in a rotationally fixed manner to the hub, and an arrangement for fixing the hub and the planet carrier in the intended position relative to one another in the axial direction. Both the hub and the planet carrier include a hole which extends in the axial direction. At least one of the holes forms at least a part of a continuous opening through the hub and the planet carrier in the axial direction. The fixing arrangement comprises an elongate element arranged in the continuous opening and an arrangement for fixing the hub and the planet carrier relative to one another in the axial direction via the elongate element.

23 Claims, 3 Drawing Sheets

U.S. PATENT DOCUMENTS

| | | | | |
|---|---|---|---|---|
| 4,655,326 A | * | 4/1987 | Osenbaugh | 188/18 A |
| 5,088,967 A | * | 2/1992 | Opitz et al. | 475/107 |
| 5,382,858 A | * | 1/1995 | Sugiyama | 310/90 |
| 5,398,776 A | * | 3/1995 | Forster | 180/308 |
| 6,090,006 A | * | 7/2000 | Kingston | 475/323 |
| 6,530,859 B1 | * | 3/2003 | Boston et al. | 475/331 |
| 6,652,405 B1 | * | 11/2003 | Staheli et al. | 475/138 |
| 6,817,963 B1 | * | 11/2004 | Solka | 475/323 |
| 6,869,380 B1 | * | 3/2005 | Oberstarr | 475/323 |
| 6,872,163 B1 | * | 3/2005 | Chung | 475/331 |
| 6,890,282 B1 | * | 5/2005 | Oberstarr | 475/323 |

FOREIGN PATENT DOCUMENTS

| | | |
|---|---|---|
| EP | 0108841 | 5/1984 |
| EP | 1234993 | 8/2002 |
| WO | WO 9903699 | 1/1999 |

OTHER PUBLICATIONS

International Preliminary Report on Patentability from corresponding PCT/SE2004/000269.

* cited by examiner

DEVICE FOR DRIVING A VEHICLE WHEEL

BACKGROUND AND SUMMARY

The present application is a continuation of International Application PCT/SE2004/000269, filed Feb. 26, 2004, which claims priority to Swedish Application No. 0300594-9, filed Mar. 5, 2003.

The present invention relates to a device for driving a wheel of a vehicle, which device comprises a hub for carrying a wheel in a rotationally fixed manner, a planetary gear connected between a driving axle and the hub, which planetary gear comprises a planet carrier which is connected in a rotationally fixed manner to the hub, and an arrangement for fixing the hub and the planet carrier in the intended position relative to one another in the axial direction. In particular, the device is intended to be applied in a work vehicle, such as a wheel loader, dumper or the like. However, the invention could also be utilized in other heavy duty vehicles, such as trucks and buses.

By virtue of arranging a planetary gear at each driving wheel in this way, a reduction in the rotational speed from the driving axle to the hub and an increase in torque from the driving axle to the hub are brought about.

WO99/03699 describes a planetary transmission for a vehicle. The hub comprises a journal extending in the axial direction which is arranged in a hole in the planet carrier. The hole has internal splines, and the journal has external splines for bringing about rotational locking in relation to one another. A plate with a greater radial extent than the journal is arranged axially inside the planet carrier and is connected to the hub via a number of screws through holes in the plate and the journal of the hub. In this way, it is ensured that the hub is axially fixed relative to the planet carrier. When the hub rotates, these screws are subjected to a relatively great varying load and tend to suffer fatigue and to break off after a period of operation.

It is desirable to produce a device for driving a vehicle wheel which leads to longer life and in particular provides a stronger construction as far as fatigue resistance is concerned.

According to an aspect of the present invention, both the hub and the planet carrier comprise a hole which extends in the axial direction, at least one of the holes forms at least a part of a continuous opening through the hub and the planet carrier in the axial direction, and the fixing arrangement comprises an elongate element arranged in the continuous opening and means for fixing the hub and the planet carrier relative to one another in the axial direction via the elongate element.

According to an aspect of the invention, the holes in the hub and the planet carrier extend centrally around the intended line of rotation of the hub. This results in a construction which is strengthened further with regard to fatigue resistance.

The elongate element is thus not subjected to a varying load when the hub rotates.

According to another aspect of the invention, the fixing arrangement comprises a portion with at least in part a greater extent in the radial direction than the holes in the hub and the planet carrier, and this portion is connected firmly to the elongate element so as to form a counterstay at a first end of the hole. The fixing arrangement also comprises interacting means for tightening the hub and the planet carrier, which tightening means are arranged at a second end of the holes in the hub and the planet carrier.

According to another aspect of the invention, the radially projecting portion comprises at least one first guide surface for guiding interaction with a correspondingly designed surface of the hub. In this way, the wear which can arise on a spline connection between the hub and the planet carrier when radial relative movement between these takes place is reduced. Furthermore, owing to this, the splines can be designed in a better way from the point of view of strength. Extra machining operations in the form of grinding spline tops on the hub axle are also avoided.

BRIEF DESCRIPTION OF THE DRAWINGS

The invention will be described in greater detail below with reference to the embodiment shown in the accompanying drawings, in which.

DETAILED DESCRIPTION

Figure 1:
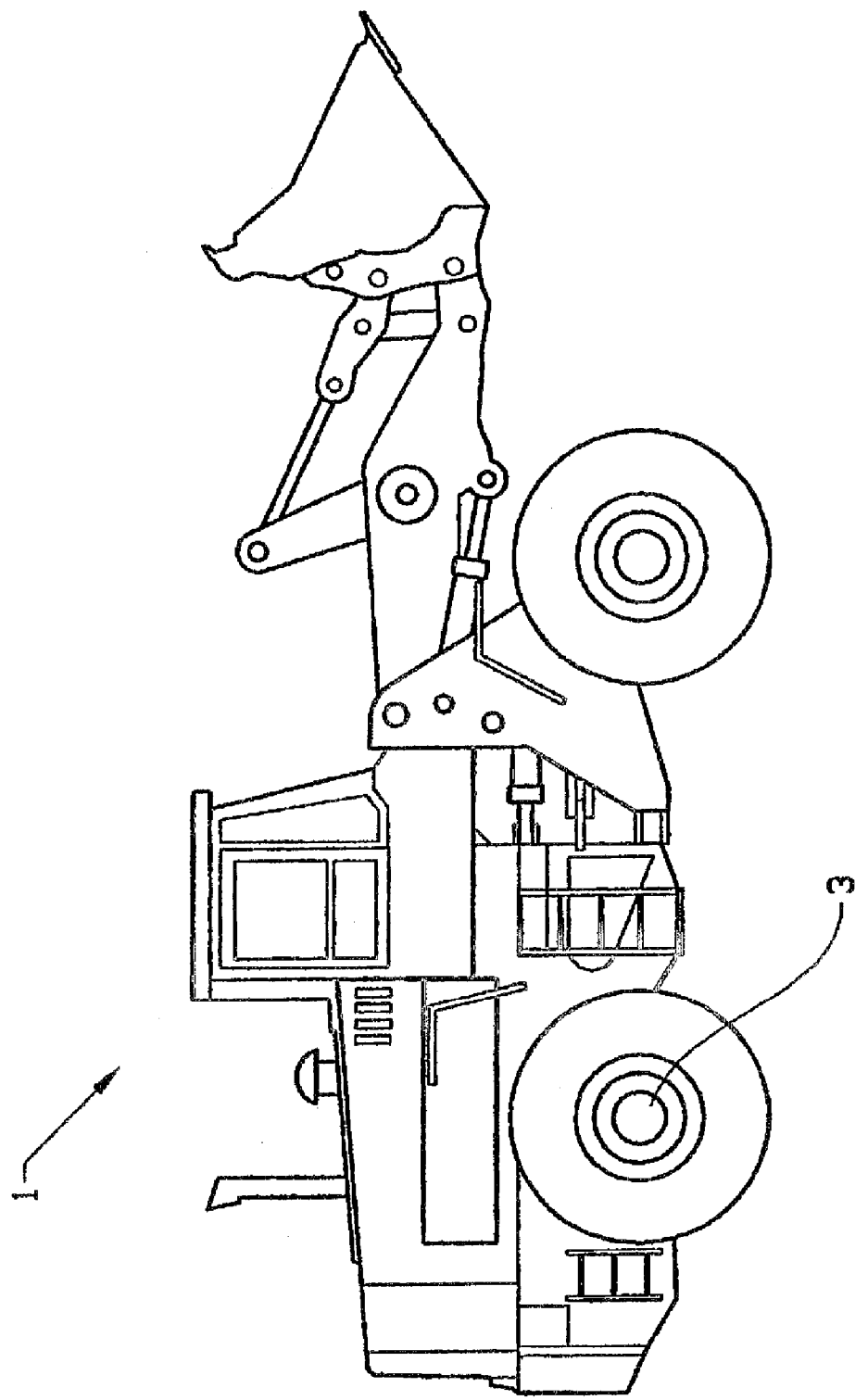
FIG. 1 illustrates a working machine in the form of a wheel loader in a side view.
Figure 2:
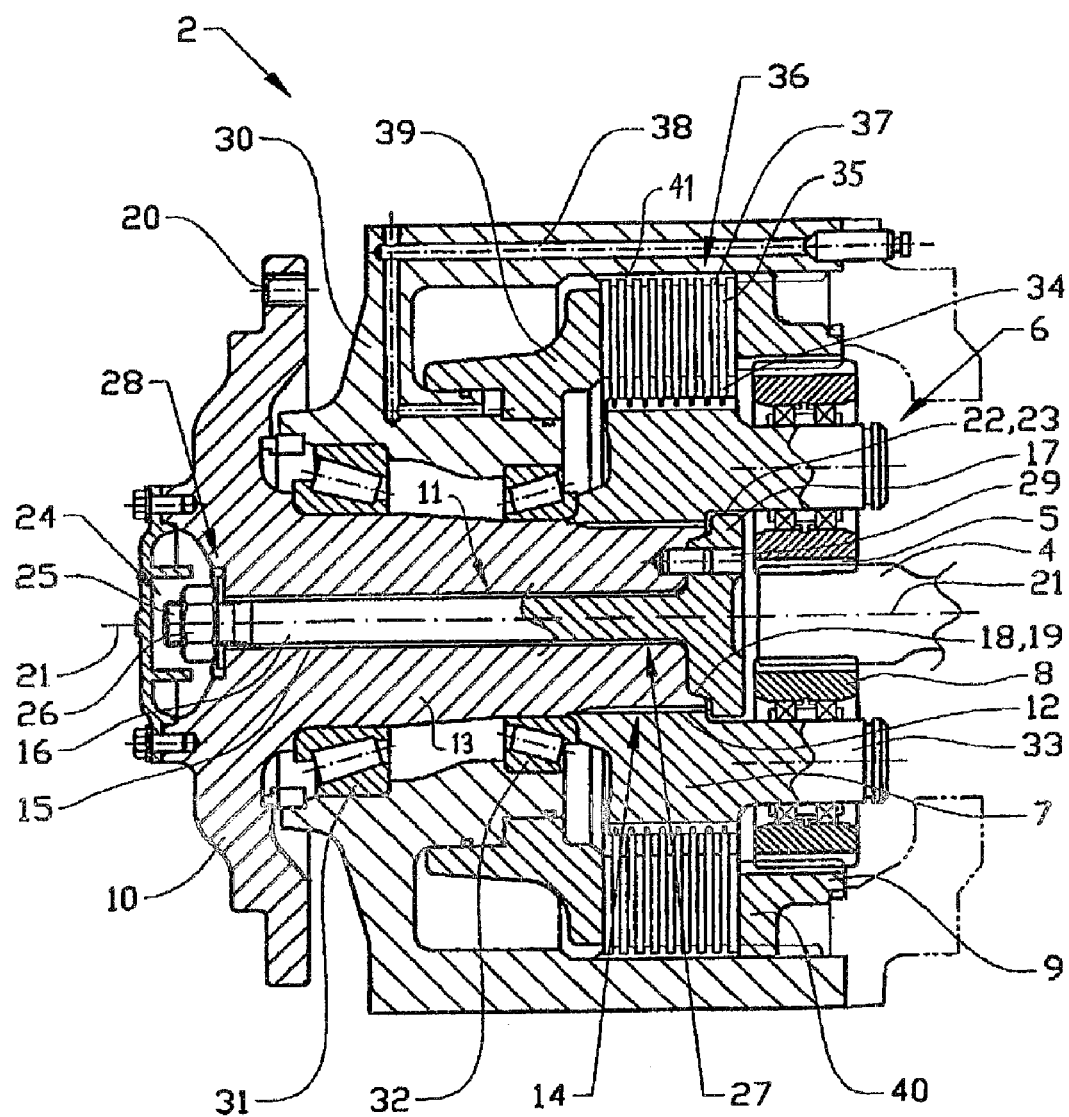
FIG. 2 illustrates a sectional side view of the device in its axial direction.
Figure 3:
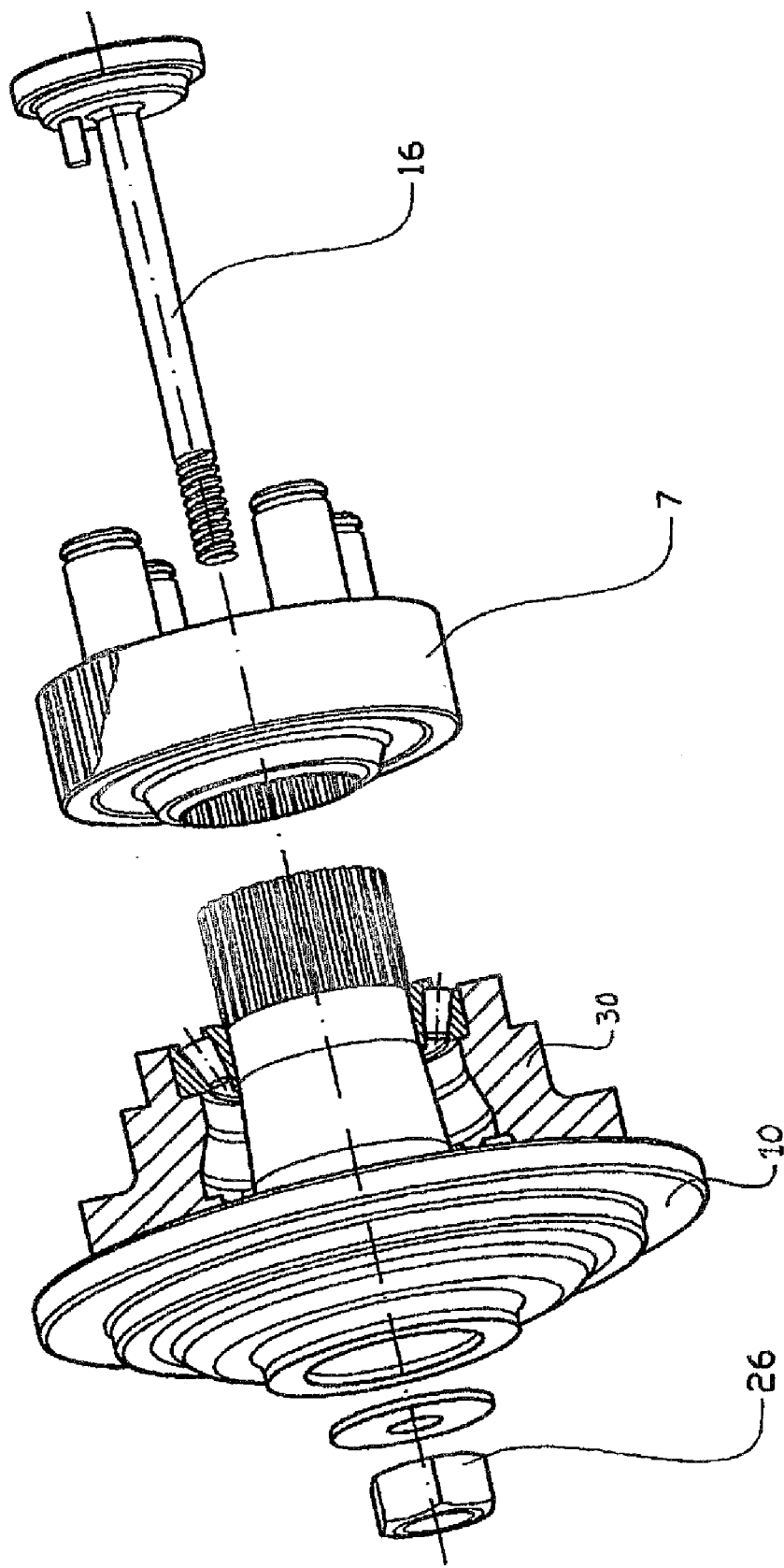
FIG. 3 illustrates an exploded view of the device.

FIG. 1 shows a wheel loader 1 in a side view. Reference is also made to FIGS. 2 and 3 below. The present invention relates to a device 2 for driving a wheel 3 of the wheel loader. The wheel loader has an engine in the form of a diesel engine (not shown) which drives the wheels 3 via a transmission. To be precise, the engine drives, via a central gear in an axle case of the vehicle, a driving axle 4 which is coupled to the driving device 2 at the respective driving wheel.

To be precise, the driving axle 4 is connected in a rotationally fixed manner to a sun gear 5 which forms part of a planetary gear 6. The planetary gear 6 also comprises a planet carrier 7, at least one planet wheel 8 which is mounted on the planet carrier 7 and arranged in engagement with the sun gear 5, and a stationary ring gear 9 with internal teeth for engagement with the external teeth of the planet wheel.

The planet carrier 7 is connected in a rotationally fixed manner to a hub 10, on which the wheel of the vehicle is intended to be fastened via screw joints 20.

The device also comprises a journal 13 which connects the planet carrier 7 and the hub 10 in the axial direction. Here, the hub 10 and the journal 13 are formed in one piece. The journal 13 therefore projects in the axial direction inward from the hub 10 in the direction of the planet carrier 7. The journal 13 has a tapering diameter from an axially outer end toward an axially inner end. The planet carrier 7 has a hole 12 which is adapted to receive a portion of the journal 13. The center line of the hole 12 of the planet carrier 7 coincides with the axis of rotation 21 of the planet carrier.

For the rotational locking, the device comprises means 14 which transmit torque between the planet carrier 7 and the hub 10. The means 14 for transmitting torque between the planet carrier 7 and the hub 10 are arranged in the hole of the planet carrier 7. These torque-transmitting means 14 consist of positive locking between the planet carrier 7 and the journal 13 of the hub 10. In this case, the positive locking is brought about with the aid of a spline connection. The journal 13 is therefore provided with external splines, and the hole 12 of the planet carrier 7 is provided with internal splines.

The device also comprises an arrangement 11 for fixing the hub 10 and the planet carrier 7 in the intended position relative to one another in the axial direction. For this purpose, the hub 10 has a hole 15 with a center line which coincides with the center line of the hole 12 of the planet carrier 7. The hole 15 forms a continuous opening through the hub and the planet carrier in the axial direction. The hole 15 of the hub 10 and the hole 12 of the planet carrier extend centrally around the intended axis of rotation 21 of the hub. The hole 15 of the hub extends through the journal 13 in the axial direction.

The fixing arrangement 11 comprises an elongate element 16 which extends in the continuous opening 15 in the hub. The elongate element 16 has a circular cross-sectional shape with an outside diameter which is smaller than the inside diameter of the opening 15.

There is preferably sufficient clearance between the elongate element 16 and the inner delimiting surface of the opening 15 for the elongate element 16 not to be subjected to any bending stress during operation. The elongate element 16 is intended to be subjected only to tensile force in order to fix the hub 10 relative to the planet carrier 7 in the axial direction.

The fixing arrangement 11 comprises means 17,24 for fixing the hub 10 and the planet carrier 7 relative to one another in the axial direction via the elongate element 16. These fixing means comprise a portion 17 with at least in part a greater extent in the radial direction than the hole 15 in the hub. This widened portion 17 is connected firmly to the elongate element 16 so as to form a counterstay at a first, axially inner, end 27 of the continuous opening 15. To be precise, the radially projecting portion 17 has at least in part a greater extent in the radial direction than the hole 12 of the planet carrier 7. The radially projecting portion 17 thus bears against a correspondingly designed surface, in the form of a shoulder, of the planet carrier. The radially projecting portion 17 is also plate-shaped or tray-shaped. Here, the elongate element 16 and the radially projecting portion 17 are designed in one piece. The radially projecting portion 17 thus forms a head on the elongate element 16.

The radially projecting portion 17 comprises a first guide surface 18 for guiding interaction with a correspondingly designed surface 19 of the planet carrier 7 and also a second guide surface 22 for guiding interaction with a correspondingly designed surface 23 of the journal. The first and second guide surfaces 18,22 are preferably of cylindrical shape.

The guide surfaces can also be conically tapering from an axially inner end in the outward direction. These guide surfaces 18,22 result in the hub 10 being centered relative to the planet carrier 7, a radial relative movement which can occur when rotation takes place thus being reduced/minimized. The loading on the spline connection 14 is thus reduced. Owing to this, it is possible to utilize a spline design which is more cost-effective from the point of view of manufacturing.

According to the present embodiment, the spline bottom is completely round (full radius). This means that air is present between the spline bottom and the bar top. A pressure angle of 30–45 and preferably approximately 37 is suitably utilized.

The fixing means also comprise interacting means 24 for tightening the hub 10 against the planet carrier 7.

These tightening means 24 comprise a threaded portion 25 on the elongate element 16 and a correspondingly designed nut 26 and are arranged at a second, axially outer, end 28 of the continuous opening 15. The nut 26 is located outside the hub 10 and is accessible from outside. Here, the elongate element 16 forms a bolt with the radially projecting portion forming a head. The threaded portion is present only at an outer end of the bolt.

The device comprises a means 29 for rotational locking of the elongate element 16 relative to the hub 10. The rotational-locking means 29 comprises a peg arranged in a hole through the plate 17 and in the hub 10 in the axial direction from inside.

The hub 10, and to be precise the journal 13, is mounted in a housing 30 for the device. The journal 13 is mounted in the housing via at least one conical roller bearing 31,32. In the embodiment shown in FIG. 2, two conical roller bearings 31,32 are arranged with a mutual spacing in the axial direction.

A radially inner part of each of the bearings 31,32 bears against the journal 13, and a radially outer part of each of the bearings bears directly against the housing 30.

The planet carrier 7 consists of an annular body, and the hole 12 is central and continuous. A number of pins 33 project in the axial direction inward from the planet carrier body. The pins 33 are arranged with a mutual spacing in the peripheral direction of the planet carrier. Each of the planet wheels 8 is mounted on one of these pins 33. The planet carrier 7 therefore has a radially inner surface which comprises the splines in the axial direction. The planet carrier 7 also has a sufficient extent in the axial direction to provide good torque-transmission to the hub 10 via the spline connection 14.

The planet carrier 7 also has a radially outer surface 34 which also comprises splines in the axial direction.

These radially external splines are intended for axial guidance of a first set of brake disks 35 in a friction brake 36. The friction brake 36 also comprises a second set of brake disks 37 guided axially in splines 41 arranged internally in the housing. According to conventional art, the brake disks in the brake 36 are arranged alternately from the first set 35 and the second set 37.

The external splines 41 of the planet carrier are arranged radially directly outside the internal splines 34. In other words, the external splines 41 are arranged at essentially the same position in the direction of the axis of rotation as the internal splines 34.

The outer ring gear 9 is also arranged at essentially the same distance in the radial direction from the axis of rotation as the friction disks in the brake. To be precise, the part which constitutes the outer ring gear 9 also forms a counterpressure surface 40 of the brake, which counterpressure surface is therefore arranged on an opposite side of the brake relative to a brake piston 39.

The friction brake 36 consists of a service brake for reduction of the speed of the vehicle. The friction brake 36 can also be activated hydraulically via the brake piston 39. A hydraulic oil duct 38 is arranged through the housing 30 for supplying oil to the piston 39.

The invention is not to be considered as being limited to the illustrative embodiments described above, but a number of further variants and modifications are conceivable within the scope of the patent claims below.

In the embodiment illustrated, only the hole in the hub forms the continuous opening through the hub and the planet carrier in which the elongate element is arranged. According to an alternative, only the hole of the planet carrier instead forms the continuous opening. In this case, the journal can be formed in one piece with the planet carrier, and the journal projects into a hole in the hub. According to another alternative, the continuous opening is formed by both the hole in the planet carrier and the hole in the hub.

According to another alternative, the journal is an intermediate, separate part comprising a continuous hole which is attached to the planet carrier and the hub, and the continuous opening is formed by at least the hole through the journal.

According to the embodiment described above, the radially projecting portion of the fixing arrangement is connected firmly to the elongate element in both the axial direction and the peripheral direction. However, the scope of the invention also includes the radially projecting portion being arranged rotatably relative to the elongate element in the non-fixed state.

According to an alternative bearing construction, a radially inner part of a first bearing bears directly against the journal, and a radially outer part of this bearing bears directly against the housing. A radially inner part of a second of the bearings bears directly against the planet carrier instead of directly against the journal. A radially outer part of this second bearing can bear directly against the housing.

According to an alternative design of the planet carrier and the hub, where the hub comprises a hole for receiving a part of the planet carrier, an inner portion of one of the bearings can be arranged directly against the hub. A large number of further alternatives are possible.

The positive locking between the planet carrier and the hub can be achieved in a number of different ways.

Those portions of the hub and the planet carrier which are interconnected for the rotational locking are to have a corresponding design which is not rotationally symmetrical. Examples of such designs are oval, triangular, polygonal cross-sectional shape etc. It is also possible to achieve the positive locking in other ways, such as with a keyed joint.

According to the embodiment described above, the means for transmitting torque between the planet carrier and the hub are arranged in the hole of the planet carrier.

According to an alternative, the torque-transmitting means are arranged in a hole in the hub, which hole receives a part of the planet carrier.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

What is claimed is:

1. A device for driving a wheel of a vehicle, comprising a hub for carrying the wheel in a rotationally fixed manner, a planetary gear connected between a driving axle and the hub, in which the planetary gear comprises a planet carrier which is connected in a rotationally fixed manner to the hub, and an arrangement for fixing the hub and the planet carrier in the intended position relative to one another in an axial direction, wherein the hub comprises a continuous hole through the hub in the axial direction wherein the planet carrier comprises a continuous opening in the axial direction, wherein at least one of the holes forms at least a part of a continuous opening through the hub and the planet carrier in the axial direction, and the fixing arrangement comprises an elongate element arranged in the continuous opening and a fastener for fixing the hub and the planet carrier relative to one another in the axial direction via the elongate element.

2. The device as claimed in claim 1, wherein a center line through the holes in the hub and the planet carrier coincides with an intended axis of rotation of the hub.

3. The device as claimed in claim 1, wherein the fastener comprises a portion with at least in part a greater extent in the radial direction than the holes in the hub and the planet carrier, and the radially projecting portion is connected to the elongate element so as to form a counterstay at a first end of the continuous opening.

4. The device as claimed in claim 3, wherein the radially projecting portion is plate-shaped.

5. The device as claimed in claim 3, wherein the elongate element and the radially projecting portion are formed in one piece.

6. The device as claimed in claim 3, wherein the radially projecting portion bears against a correspondingly designed surface of the planet carrier.

7. The device as claimed in claim 3, wherein the radially projecting portion comprises at least one first guide surface for guiding interaction with a correspondingly designed surface of the planet carrier.

8. The device as claimed in claim 7, wherein the first guide surface is of cylindrical or conical shape.

9. The device as claimed in claim 1, wherein the fastener comprises one or more interacting tightenable fasteners for tightening the hub and the planet carrier, which tightenable fasteners are arranged at a second end of the continuous opening.

10. The device as claimed in claim 9, wherein the tightenable fasteners comprise a threaded portion on the elongate element and a correspondingly designed nut.

11. The device as claimed in claim 9, wherein the tightenable fasteners is arranged at an axially outer end of the continuous opening in the hub.

12. The device as claimed in claim 1, wherein the elongate element is rotationally symmetrical, and the device comprises a peg for rotational locking of the elongate element relative to the planet carrier.

13. The device as claimed in claim 1, wherein the device also comprises a journal which connects the planet carrier and the hub in the axial direction, and in that the journal comprises the continuous opening for receiving the elongate element.

14. The device as claimed in claim 13, wherein the hub and the journal are formed in one piece.

15. The device as claimed in claim 14, wherein the hole of the planet carrier is adapted for receiving the journal.

16. The device as claimed in claim 13, wherein the fastener comprises a portion with at least in part a greater extent in the radial direction than the hole in the planet carrier, and the radially projecting portion comprises at least one second guide surface for guiding interaction with a correspondingly designed surface of the journal.

17. The device as claimed in claim 16, wherein the second guide surface is of cylindrical or conical shape.

18. The device as claimed in claim 1, wherein the planet carrier and the hub are interconnected in a rotationally fixed manner in relation to one another via positive locking.

19. The device as claimed in claim 1, wherein the planet carrier and the hub are interconnected in a rotationally fixed manner in relation to one another via a spline connection.

20. The device as claimed in claim 13, wherein the journal is provided with external splines and the hole of the hub is provided with internal splines.

21. The device as claimed in claim 1, wherein a friction brake is arranged outside the planet carrier for braking the planet carrier relative to a static housing part.

22. The device as claimed in claim 21, wherein the friction brake comprises a service brake.

23. A work vehicle comprising a device as claimed in claim 1.

* * * * *